Figure 1:
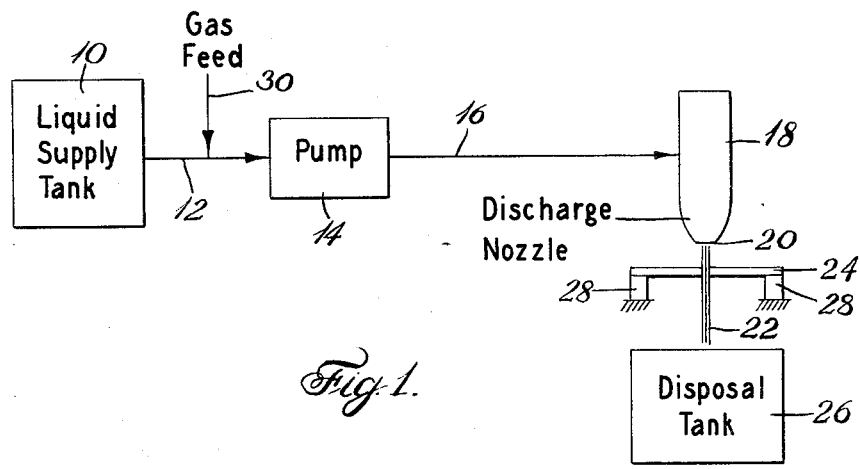

INVENTOR.
PHILIP K. RICE

United States Patent Office 3,212,378
Patented Oct. 19, 1965

3,212,378
PROCESS FOR CUTTING AND WORKING
SOLID MATERIALS
Philip K. Rice, White Plains, N.Y., assignor to Union
Carbide Corporation, a corporation of New York
Filed Oct. 26, 1962, Ser. No. 233,259
10 Claims. (Cl. 83—53)

This invention relates generally to the cutting and working of solid materials and, more particularly, to an improved process for subjecting a solid material to cutting action by means of a liquid jet.

Heretofore, it has been known to cut, grind, and otherwise work solid materials by means of liquid jets. For example, U.S. Patent No. 2,985,050 to B. G. Schwacha describes the use of supersonic jets of liquid to cut hard, high strength materials such as stainless steel. It has also been proposed to increase the cutting force of such liquid jets by using a valve to periodically chop or interrupt the jet so as to produce a plurality of liquid "slugs" rather than a continuous liquid stream. However, the production of such an intermittent jet by valving at the liquid velocities that are necessary for effective cutting is difficult because of wear on the valve, necessary rapidity of valve operation, and other problems associated with valving at such high liquid velocities.

It is, therefore, the main object of the present invention to provide an improved process for subjecting solid materials to cutting action by means of an interrupted liquid jet.

It is another object of the invention to provide such a process which does not require a valving operation to produce the interrupted liquid jet.

Other aims and advantages of the invention will be apparent from the following description and appended claims.

Figure 2:
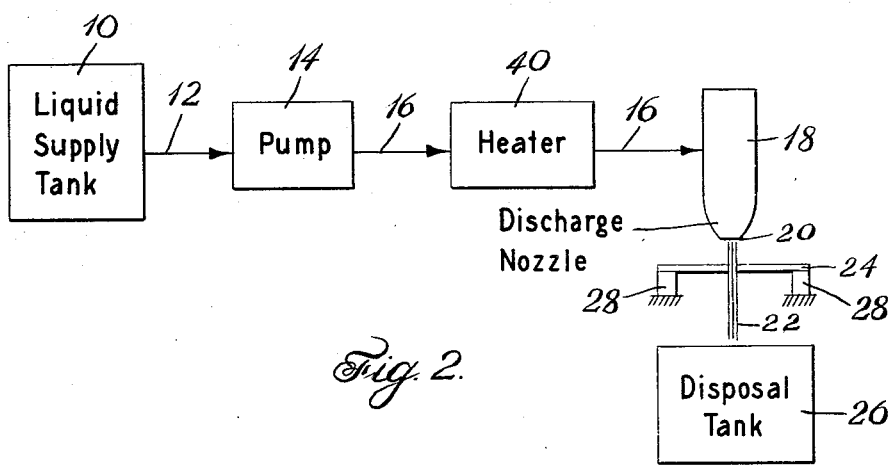

In the drawings:

FIG. 1 is a schematic flow diagram of a preferred embodiment of the present invention; and FIG. 2 is a schematic flow diagram of a modified embodiment of the invention.

In accordance with the present invention, there is provided a process for subjecting a solid material to cutting action by means of a liquid jet comprising pressurizing a working liquid and ejecting it through a discharge nozzle to form a fine high-velocity jet, introducing a gas into the liquid so that the resulting jet is a mixed liquid-gas jet, positioning the solid material close to the discharge end of the nozzle, and directing the liquid-gas jet against the solid material so as to remove a portion of the solid material by the cutting action of the jet.

By forming a mixed liquid-gas jet, this invention subjects the solid material being worked to the relatively high cutting forces provided by an intermittent jet, but without using a valve to form the jet. In effect, the liquid jet is interrupted by the gas phase of the liquid-gas mixture rather than by means of a mechanical valve operation. The interruption may be complete so as to chop or sever the liquid stream and form intermittent liquid slugs, or it may be partial so as to form a plurality of dispersed voids or interstices throughout the jet. The particular gas employed is not critical and may be air, carbon dioxide, vapor from the working liquids, or any other desired gas.

The cutting action produced by the mixed liquid-gas jet may be used not only to cut or pierce the solid material against which it is directed, but also to clean, grind, shape, or otherwise work the solid material. Liquid cutting processes in general are applicable to a wide variety of solid materials, including metals, alloys, stone, and the like. The liquid cutting action is more efficient with hard materials than with soft or flexible materials because the softer materials tend to absorb the energy from the jet without being cut.

Interdependent factors which determine the magnitude of the cutting force exerted on the material being worked are the particular type of working liquid employed, the velocity of the liquid, the size of the orifice in the discharge nozzle, the distance between the end of the nozzle and the workpiece, and the angle at which the jet is directed against the workpiece. A number of suitable working liquids are well known in the art of liquid cutting, typical examples being oils such as non-chlorinated petroleum oils, water, alcohols, mixtures of glycerine and water, and the like. The viscosity of the liquid should be such that it flows readily at the particular pressure employed. Other examples of suitable working liquids are described in the aforementioned Schwacha Patent No. 2,985,050, along with factors to consider in choosing such liquids.

In the absence of externally added energy such as heat input, the velocity of the liquid jet is determined by the enthalpy drop across the nozzle or orifice, assuming the velocity of the liquid approaching the nozzle is negligible. For relatively incompressible liquids such as water and oil, the pressure drop is essentially equal to the enthalpy drop, and thus the jet velocity is determined by the pressure difference across the nozzle. The orifice size and configuration affects the jet velocity only insofar as the configuration, length, and diameter introduce friction and/or turbulence losses. A velocity of at least about 500 feet per second is usually required for shearing hard materials. Such velocities can be obtained by pressurizing the liquid to 2000 to 3000 pounds per square inch. For commercially significant jet powers at these pressures and velocities, orifice diameters will range from 0.020 inch and upward. Of course, both higher and lower velocities can be attained for various applications by simply adjusting the liquid pressure and/or the orifice diameter as desired. In general, the liquid pressure should be from about 1500 to as high as 50,000 pounds per square inch and possibly higher with orifice diameters from 0.02 to 0.500 inch.

Since the jet decreases in velocity rather rapidly as it leaves the discharge nozzle, the workpiece should be positioned relatively close to the end of the nozzle, generally less than about five inches from the nozzle end. The angle at which the jet is directed against the workpiece depends largely on the purpose for which the jet is being used. For example, for cutting or shearing applications the jet is directed perpendicular to the surface of the workpiece, whereas for cleaning or grinding applications the jet is usually directed against the workpiece at an angle.

Referring now to the drawings, FIG. 1 is a flow diagram of a preferred embodiment of the inventive process. The working liquid such as water or petroleum oil, is fed from a liquid supply tank 10 through a line 12 into a pressurizing pump 14. The type of pump employed depends largely on the type of jet and pressure required for any particular application. For example, a centrifugal pump may be used to produce a constant pressure, non-pulsating jet for relatively low pressure applications, such as cleaning and grinding operations. Similarly, a reciprocating pump may be used to produce a pulsating jet at relatively high pressures, such as for cutting or forming operations. If desired, a pulsation chamber may be located downstream from the reciprocating pump to dampen or eliminate the usual pump discharge pressure fluctuations. The present invention is equally applicable to both pulsating and non-pulsating jets and imposes no limitations on the jet pressure. In general, of course, greater pressures produce greater cutting action for any given jet size, and for most applications a pressure of at least about 3000 pounds per square inch is preferred.

The pump pressurizes the working liquid and feeds it through a line 16 into a discharge nozzle 18 at the desired pressure. The pressurized liquid increases in velocity as it passes through the discharge nozzle 18 and is ejected through an orifice 20 at the exit end of the nozzle 18 to form a fine high-velocity cutting jet 22. As described above, the velocity of the cutting jet 22 is controlled by adjusting the pressure of the working liquid entering the nozzle from the line 16 and the diameter of the nozzle orifice 20. A solid workpiece 24, resting on rigid supporting members 28, is positioned in proximity to the discharge end of the nozzle 18 so that the jet 22 can be directed against the workpiece 24 as it issues from the nozzle. In the embodiment shown in the drawing, the jet 22 is directed normally against the workpiece 24 at a velocity sufficient to cut completely through the workpiece. However, in many cases it is desirable to use a lower jet velocity so as to remove only a portion of the surface of the workpiece, such as in cleaning and grinding operations. A disposal tank 26 is placed beneath the workpiece 24 to catch the jet 22 as it passes through the workpiece and to absorb the remaining energy in the jet. The disposal tank 26 may be filled with any suitable flexible material, such as a liquid or soft rubber. All the elements described thus far in connection with the drawing are conventional and well known in the art of liquid cutting (e.g. U.S. Patent No. 2,895,050 to Schwacha), and further details thereof need not be described herein. The present invention, however, modifies the conventional liquid cutting system by introducing air or other gas into the working liquid so that the resulting jet is a heterogeneous mixture of liquid and gas.

Referring back to the line 12 between the liquid supply tank 10 and the pressurizing pump 14, one preferred method of introducing the gas into the working liquid is to pass the gas through a feed line 30 into the liquid in the line 12. The resulting liquid-gas mixture is passed into the pressurizing pump 14, on through the line 16 into the discharge nozzle 18, and is finally ejected as a mixed liquid-gas jet through the nozzle orifice 20. This system is desirable in that it feeds the gas into the liquid before the liquid is pressurized, thus avoiding the need for supplying the feed gas under high pressure. Of course, the gas may be fed into the liquid in the supply tank 10 or even in the pump 14 rather than in the line 12. When the liquid-gas mixture is pressurized by the pump 14, the gas may be partially or fully dissolved in the liquid, depending on the temperature, pressure, and the particular gas and liquid employed. However, any gas which dissolves when the mixture is pressurized comes out of solution when the pressure is subsequently reduced in the discharge nozzle, or even after exiting from the discharge nozzle.

When the gas is mixed with the working liquid before the liquid leaves the pump 14, the larger volume of the liquid-gas mixture (as compared with the liquid alone) decreases the effective capacity of the pump 14. Thus, it is often desirable to feed the gas into the liquid after it leaves the pump 14, such as in the line 16 or in the discharge nozzle 18. When the gas is injected into the liquid in the discharge nozzle, it may be injected either at the center of the nozzle or through holes in the nozzle periphery. In order to prevent the escape of the pressurized liquid into the gas feed line in such cases, the gas must be supplied under a pressure at least as high as that of the liquid at the point of injection.

Another method of introducing gas into the working liquid is illustrated in FIG. 2. The system shown in FIG. 2 is the same as that of FIG. 1 except that the gas feed line 30 is deleted and a heater 40 is provided in the line 16 to heat the liquid while it is pressurized. The heater 40 increases the temperature of the liquid sufficiently that a vapor fraction is formed upon the subsequent reduction in pressure in the discharge nozzle, thereby forming a mixed liquid-gas jet wherein the gas is a vapor fraction of the cutting liquid. This system of introducing gas into the liquid jet yields an increase in jet velocity for a given upstream nozzle pressure by virtue of added energy input in the form of heat.

In any of the aforedescribed methods of inntroducing a gas into the working liquid, the amount and type of gas introduced may be adjusted either to completely sever or chop the liquid stream periodically so as to form a jet of alternate liquid and gas slugs, or to merely form a heterogeneous liquid-gas mixture wherein the gas phase forms intermittent voids or interstices in the liquid phase without destroying its continuity. It is also possible to form a jet in which the gas phase completely severs the liquid stream at certain points to form intermittent liquid slugs, and also forms small voids or interstices in the individual liquid slugs. In all these cases, the liquid is periodically interrupted, either partially or completely, and thus subjects the work piece to increased cutting action.

While various specific forms of the present invention have been illustrated and described herein in some detail, it will be apparent that the same are susceptible of numerous modifications within the scope of the invention. For example, methods other than those described may be devised for introducing the gas into the working liquid to form a mixed liquid-gas jet. Also, while the cutting jet has been described as being solely liquid and gas, it is often desirable to add a finely divided abrasive to the working liquid to increase its cutting action. Such abrasives, such as finely divided aluminum oxide, and methods for introducing them into the working liquid are well known in the art of liquid cutting. Moreover, although the gas is usually fed into the liquid in a continuous manner, it may be fed into the liquid intermittently by use of a valve and periodic interruption of the gas flow, either to periodically sever the liquid jet or to disperse the gas in a homogeneous manner throughout the jet.

What is claimed is:

1. A process for subjecting a solid material to cutting action by means of a liquid jet comprising:
    (a) pressurizing a working liquid and ejecting it through a discharge nozzle to form a fine high-velocity jet;
    (b) periodically introducing a gas into said liquid to interrupt said jet and form an alternate liquid-gas jet;
    (c) positioning the workpiece in proximity to the discharge end of said nozzle; and
    (d) directing said liquid-gas jet against said workpiece so as to remove a portion of said workpiece by the cutting action of said jet.

2. The process of claim 1 wherein the working liquid is oil.

3. The process of claim 1 wherein the orifice of said discharge nozzle is less than about 0.02 inch in diameter.

4. The process of claim 1 wherein the working liquid is pressurized sufficiently to produce a jet having a velocity of at least about 500 feet per second.

5. A process for subjecting a hard workpiece to cutting action by means of a liquid jet comprising:
    (a) introducing a gas into a working liquid to form voids therein which periodically interrupt said liquid;
    (b) pressurizing said void containing liquid and ejecting it through a discharge nozzle to form an alternate liquid-gas jet; and
    (c) directing said liquid-gas jet against said workpiece.

6. A process for subjecting a hard workpiece to cutting action by means of a liquid jet comprising:
    (a) pressurizing a working liquid and ejecting it through a discharge nozzle to form a jet;
    (b) periodically chopping said jet by intermittently injecting a gas into said liquid in said discharge nozzle to form an alternate liquid-gas jet; and
(c) directing said liquid-gas jet against said workpiece.

7. A process for subjecting a hard workpiece to cutting action by means of a liquid jet comprising:
(a) pressurizing a working liquid;
(b) increasing the temperature of the pressurized working liquid sufficiently to produce intermittent vapor fractions which periodically interrupt said liquid upon expansion of said liquid;
(c) ejecting the heated liquid through a discharge nozzle to form a jet, the expansion of said heated liquid upon ejection through said nozzle forming voids in an alternate liquid-vapor jet; and
(d) directing and liquid-vapor jet against said workpiece.

8. A process for subjecting a solid material to cutting action by means of a liquid jet comprising:
(a) pressurizing a working liquid and ejecting it through a discharge nozzle to form a fine high-velocity jet;
(b) periodically chopping said jet by introducing a gas into said liquid so as to form a liquid-gas jet of alternate liquid and gas slugs;
(c) positioning the workpiece in proximity to the discharge end of said nozzle; and
(d) directing said liquid-gas jet against said workpiece so as to remove a portion of said workpiece by the cutting action of said jet.

9. A process for subjecting a solid material to cutting action by means of a liquid jet comprising:
(a) pressurizing a working liquid and ejecting it through a discharge nozzle to form a fine high-velocity jet;
(b) introducing a gas into said liquid so as to form an alternate liquid-gas jet wherein the liquid phase is periodically interrupted by the gas phase;
(c) positioning the workpiece in proximity to the discharge end of said nozzle; and
(d) directing said liquid-gas jet against said workpiece so as to remove a portion of said workpiece by the cutting action of said jet.

10. A process for subjecting a solid material to cutting action by means of a liquid jet comprising:
(a) pressurizing a working liquid and ejecting it through a discharge nozzle to form a high-velocity jet;
(b) periodically chopping said jet by intermittently breaking down said liquid to form a liquid-vapor jet of liquid and vapor slugs;
(c) positioning the workpiece in proximity to the discharge end of the nozzle; and
(d) directing said liquid-vapor jet against said workpiece so as to remove a portion of said workpiece by the cutting action of said jet.

References Cited by the Examiner
UNITED STATES PATENTS

| | | | |
|---|---|---|---|
| 2,200,587 | 5/40 | Tirrell | 51—321 X |
| 2,489,097 | 11/49 | Luce | 51—11 |
| 2,858,653 | 11/58 | Guptill | 51—321 X |
| 2,985,050 | 5/61 | Schwacha | 83—53 |

ANDREW R. JUHASZ, *Primary Examiner.*